United States Patent
Junot et al.

[11] Patent Number: 5,490,586
[45] Date of Patent: Feb. 13, 1996

[54] COVER PLATE FOR A DIAPHRAGM CLUTCH, ESPECIALLY FOR A MOTOR VEHICLE

[75] Inventors: Gilbert Junot, Vers Sur Selle; Pierre Warnke, Amiens, both of France

[73] Assignee: Valeo, Paris, France

[21] Appl. No.: 240,594

[22] Filed: May 10, 1994

[30] Foreign Application Priority Data

May 11, 1993 [FR] France ................... 93 05649

[51] Int. Cl.⁶ ................................... F16D 13/58
[52] U.S. Cl. .................... 192/89.23; 192/70.27
[58] Field of Search .................... 192/89.22, 89.23, 192/89.24, 70.27, 70.13

[56] References Cited

U.S. PATENT DOCUMENTS

| | | | |
|---|---|---|---|
| 3,213,991 | 10/1965 | Smirl et al. | 192/89.23 X |
| 5,092,442 | 3/1992 | Takashi | 192/70.27 |

FOREIGN PATENT DOCUMENTS

| | | | |
|---|---|---|---|
| 1524350 | 4/1968 | France . | |
| 1580169 | 7/1969 | France . | |
| 2381938 | 9/1978 | France | 192/89.24 |
| 2526901 | 11/1983 | France . | |
| 3304711 | 8/1984 | Germany . | |
| 0552952 | 4/1943 | United Kingdom . | |
| 2192244 | 1/1988 | United Kingdom . | |

*Primary Examiner*—Richard M. Lorence
*Attorney, Agent, or Firm*—Longacre & White

[57] ABSTRACT

A diaphragm clutch, especially of the push-off type, has a metallic, annular, dished cover plate which comprises a junction zone which joins a base, oriented generally transversely, to an annular skirt oriented generally axially. The cover plate is in two parts, namely a base which is secured by welding to the junction zone, the latter being part of the second or outer part of the cover plate and comprising the skirt which is integral with the junction zone. The second part of the cover plate can be a standard cover plate usually employed in a pull-off clutch.

9 Claims, 1 Drawing Sheet

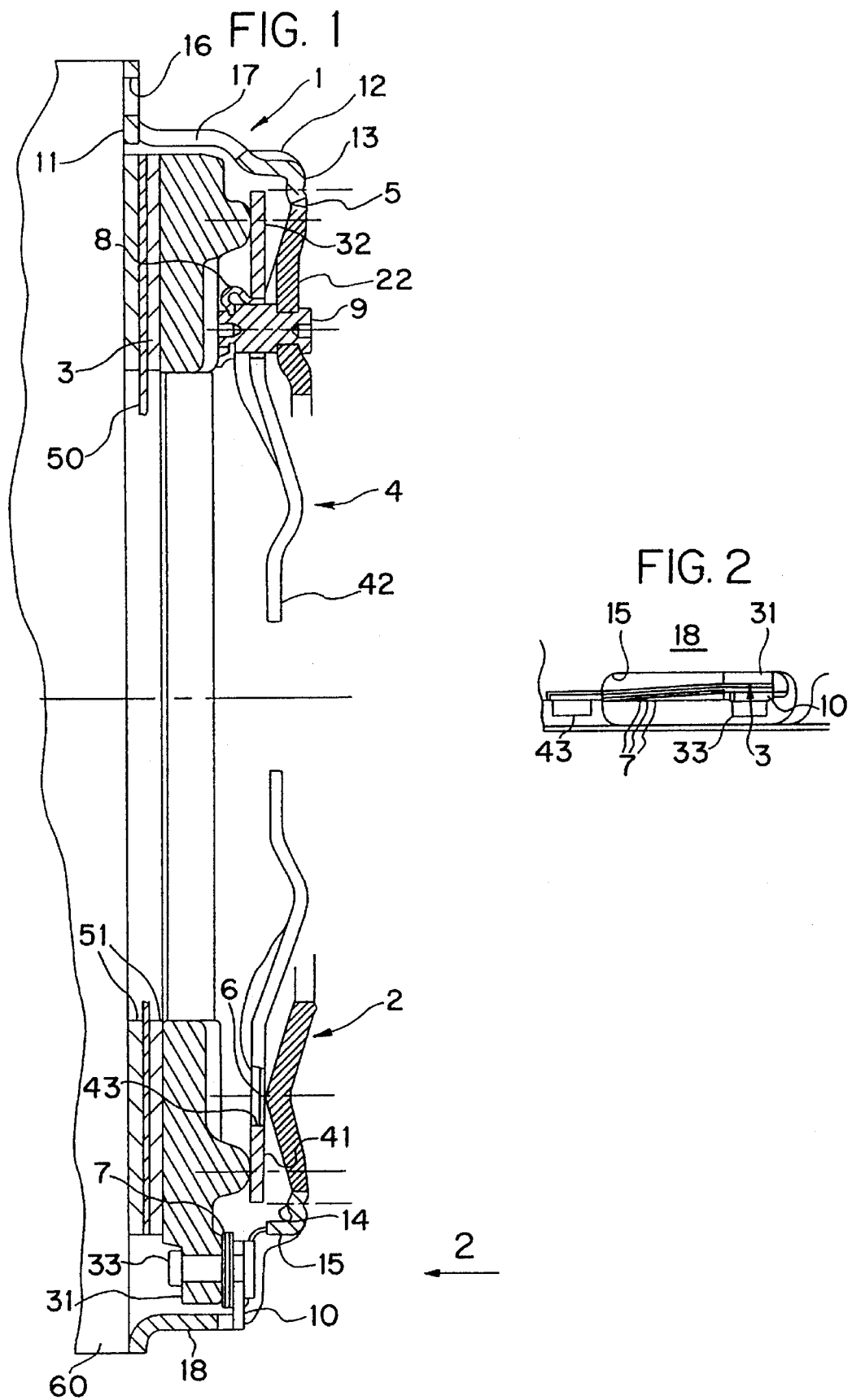

COVER PLATE FOR A DIAPHRAGM CLUTCH, ESPECIALLY FOR A MOTOR VEHICLE

FIELD OF THE INVENTION

The present invention relates to metallic, dished cover plates for diaphragm clutches, especially for motor vehicles.

BACKGROUND OF THE INVENTION

As is well known, such a cover plate, which is usually made by press-forming, includes a base and forms one of the constituents of a clutch mechanism which constitutes a unitary assembly. Besides the cover plate, such a mechanism includes at least one pressure plate which is coupled in rotation to the cover plate, leaving the pressure plate free to move axially with respect to the latter. It also includes a diaphragm which has a Belleville ring portion and radial fingers, which bear on the base of the cover plate so as to act on the pressure plate and bias the latter away from the base of the cover plate. Such mechanisms are disclosed in U.S. patent specifications Nos. 3 489 256 and 3 499 512, and the corresponding French published patent specifications FR 1 580 169A and FR 1 524 350A respectively.

In the document FR I 580 169A, the diaphragm bears, through the outer periphery of its Belleville ring portion, on a seating or engagement element which is carried by the cover plate in a junction zone of the latter, while it bears at the inner periphery of its Belleville ring portion on another engagement or seating element, commonly of divided form, which is carried by the pressure plate. In this case, the clutch is of the pull-off type in which, in order to disengage the clutch, it is necessary to exert traction, using a clutch release bearing, on the inner ends of the fingers of the diaphragm.

In the document FR I 524 350A, the diaphragm is mounted pivotally, through the inner periphery of its Belleville ring portion, on the cover plate through assembly means which mount the diaphragm pivotally on the cover plate, while the diaphragm bears, at the outer periphery of its Belleville ring portion, on a seating or engagement element of the pressure plate. The assembly means mentioned above are carried by a base of the cover plate which is integral with a junction zone by which the base is joined to an axially oriented skirt of the cover plate. In this case, the clutch is of the push-off type, which is disengaged by exerting a thrust on the inner ends of the fingers of the diaphragm by means of a clutch release bearing.

In the case where the clutch is of the push-off type, problems arise when the number of cover plates to be made is small, i.e. where not many are required over a given period of time. In this connection, cover plates are conventionally made by press-forming, and as a result, the press tooling for push-off clutch cover plates is quite expensive, i.e. not particularly cost effective, when the production quantities are low. These low quantities arise mainly from the fact that some vehicle manufacturers may desire one type of assembly means, while others want another type.

DISCUSSION OF THE INVENTION

An object of the present invention is to overcome this drawback and accordingly to reduce manufacturing costs of cover plates for clutches of the push-off type in low production runs.

According to the invention, an annular, dished, metallic clutch cover plate, for a clutch having a diaphragm, especially for a motor vehicle, being of the kind having a junction zone joining a base, which is oriented generally transversely, to an annular skirt which is oriented generally axially, is characterised in that the cover plate is in two parts, namely a base secured by a welded joint to the said junction zone, the junction zone being part of the other part of the cover plate, the said other part also including the said skirt, which is integral with the junction zone.

Using this invention, the tooling required for manufacture of the base of the cover plate is reduced in cost, and it is possible to use, even for a push-off clutch, a standard cover plate for a clutch mechanism of the pull-off type. In this way, the manufacturing output of pull-off type clutch cover plates is increased, and advantage can also be taken of the general robustness of such a cover plate, which has the further benefit that its weight is reduced.

In addition, the metallic base of the cover plate can with advantage carry any type of assembly means for mounting the diaphragm to the cover plate; and, by contrast with the arrangement disclosed in British published patent specification GB 2 192 244A, its thickness may be whatever is appropriate for minimising deformation during operation of the clutch.

According to a preferred feature of the invention, at least the major part of the base of the cover plate is thicker than the junction zone and annular skirt.

These arrangements lead to an excellent lifting action for the pressure plate, together with savings in material.

In addition, it is possible to make the two parts of the cover plate in different locations, and eventually to assemble the two parts together by welding, when required, in a third location. It is also possible to superimpose other functions on the cover plate as required, for example ventilating fins projecting from its base.

The weld joining the two parts of the cover plate together is preferably formed inexpensively using a laser beam. Preferably, the welded joint takes the form of a continuous weld seam in order to give the cover plate the best possible solidity.

A preferred embodiment of the invention will be described below, by way of example only and with reference to the accompanying drawings.

BRIEF DESCRIPTION OF THE DRAWINGS

FIG. 1 is a view in axial cross section of a clutch mechanism in accordance with the invention, with the reaction plate of the clutch and the friction disc of the clutch being shown partially, in fine lines.

FIG. 2 is a partial view in the direction of the arrow 2 in FIG. 1.

DESCRIPTION OF A PREFERRED EMBODIMENT OF THE INVENTION

The drawings show a motor vehicle clutch mechanism for a clutch of the push-off type. This mechanism constitutes a unitary assembly which is arranged to be carried by the transversely oriented peripheral flange 11 of a metallic cover plate 1, 2, on the reaction plate 60 of the clutch. To this end, and in a known manner, the flange 11 is in this example formed with fastening holes through which fasteners, for example screws not shown, can pass in order to secure it to the reaction plate 60.

Besides the above mentioned cover plate 1, 2, the mechanism has an annular pressure plate 3, which in this example is cast, together with a diaphragm 4. In a known manner, the diaphragm 4 constitutes an axially acting resilient means, and for this purpose it includes a peripheral portion 41 of continuous form and constituting a Belleville ring, together with a central portion which is divided into radial fingers 42 by means of slots which are open at one end into a common central opening, and at the other end into the widened apertures 43 which are arranged at the inner periphery of the Belleville ring 41. In its free state, the diaphragm is frusto-conical in shape.

The cover plate 1, 2 is annular in shape and has the general form of a dish. Accordingly, it includes the above mentioned fastening flange 11, with an annular skirt 12, oriented generally axially and joined to the inner periphery of the flange 11, being extended as far as a junction zone 13. This junction zone joins the skirt 12 to a base 2, which is oriented generally transversely, in a manner described below. In the present example the skirt 12 surrounds the pressure plate 3 and the diaphragm 4, the reaction plate 60 being of the flat type.

The cover plate may of course be less deep, and the reaction plate may be hollow in the manner described in the above mentioned French published patent application FR 1 580 169A.

As is well known, in a motor vehicle the reaction plate 60 is mounted for rotation with the crankshaft of the internal combustion engine of the vehicle, and may be divided into two parts which are coupled together by means of a torsion damper, while the disc 50 (described below) is secured to the input shaft of the transmission of the vehicle (most commonly a gearbox), for rotation with that shaft.

The diaphragm 4 bears on the base 2 of the cover plate 1, 2 so as to act on the pressure plate 3 and bias the latter axially away from the base 2, so that the friction liners 51 on the friction disc 50 are gripped between the pressure plate 3 and reaction plate 60. For this purpose, the pressure plate 3 is coupled to the cover plate 1, 2, but with some axial mobility.

In this example, this coupling is obtained by means of tangential tongues 7 which are flexible in the axial direction. These resilient tongues are attached at their ends by means of fastening members 43 and 33 (see FIG. 2), each to a respective attachment zone of the flange 11 of the metallic cover plate 1, 2, and an ear 31 of the pressure plate 3 projecting radially from the outer periphery of the pressure plate.

In this example, there are three ears 31 and three sets of superimposed tongues 7, with these ears 31 and tongues 7 being spaced apart circumferentially at regular intervals. However, this does depend on the application, and four sets of tongues and four ears may be provided, as is for example disclosed in U.S. patent specification No. 4 609 085 (French published patent application FR 2 526 901A), which describes a clutch mechanism which also has within it a friction disc interposed between two pressure plates.

As in that United States patent specification, the members 33, which in this example consist of rivets, as do the members 43 (or in a modification, screws), also secure a retaining plate 10 which is interposed between the heads of the rivets 33 and the resilient tongues 7. For this purpose, the skirt 12, which is formed with ventilating slots 17, has in the region of the tongues 7 local projections 18 which surround the radial ears 31 of the pressure plate 3. Openings 15 are formed in the base of the projections 18 so as to be clear of the heads of the rivets 33.

The retaining plates 10 are arranged to cooperate with the upper edge of the openings 15, in order to prevent the pressure plate 3 from separating from the base 2 of the cover plate 1, 2 by more than a predetermined amount. By virtue of this arrangement, the retaining plates 10 serve as limiting means for limiting the axial travel of the pressure plate 3 under the action of the diaphragm 4. Thus, during storage, when the mechanism is not mounted on the reaction plate 60, the retaining plates 10 protect the tongues 7, which thus suffer no danger of becoming damaged by deformation, and in particular the danger of being stressed beyond their elastic limit.

In a modification, it is possible to make use of bar-like elements such as spigots, as is for example disclosed in French published patent specification No. 1 580 169, as the means for limiting the axial travel of the pressure plate.

Similarly, the rotational coupling, with axial mobility, between the pressure plate and cover plate may be obtained by means of radial lugs of the pressure plate, which engage in complementary slots formed in the skirt 12.

In the present example the cover plate 1, 2 is a steel pressing. It is formed in the press, using suitable tooling, by drawing one flank of the sheet metal blank having a constant thickness.

More precisely, the annular cover plate 1, 2 is in two parts 1 and 2, namely a first or inner part comprising a base 2 which is secured by welding to the junction zone 13 of the second part 1 of the cover plate. This second or outer part includes, integrally, the junction zone 13, skirt 12 and (here) the fastening flange 11. The welded joint between the base 2 and second part 1 of the cover plate preferably constitutes a continuous annular weld seam which is shown at 3 in the drawings. In this example this is formed in an inexpensive manner by means of a laser beam, between the edge of the inner periphery of the junction zone 13 and the corresponding edge of the outer periphery of the metallic base 2, thus reducing the axial size of the cover plate 1, 2. The weld is preferably formed through the metal thickness. It is of course possible to use another type of welding, for example spot welding. To this end, it will be noted that the associated sections of the junction zone 13 and base 2 are of generally the same thickness. The thickness of the base 2 is thus reduced at this level.

The first part 11, 12, 13 of the cover plate constitutes a cover element, having in this example a constant thickness, of a kind suitable for a clutch diaphragm of the pull-off type, as is described in the above mentioned French patent specification FR 1 580 189A, while the base 2 of the cover plate constitutes the base of a cover plate suitable for a clutch of the push-off type, as described in the above mentioned French patent specification FR 1 524 350A. The junction zone 13 in this example is of rounded form beyond the seating element 14 which is described below.

At least the greater part of the base 2 which constitutes the inner part of the cover plate is thicker than its outer part 11, 12, 13. More precisely, the main portion of the base 12 is thicker than the outer part of the cover plate. The latter includes the seating element 14, which is in the form of a bead projecting towards the pressure plate 3 and formed by pressing. It is on this pressed element 14 that the outer periphery of the Belleville ring 41 of the diaphragm bears in a clutch of the pull-off type.

In this example, the outer periphery of the Belleville ring 41 bears on a divided annular boss 32 of the pressure plate 3, while at its inner periphery the Belleville ring is mounted for pivoting movement on the base 2 of the cover plate, by assembly means 9, 8, 6 which couple the diaphragm 4 pivotally to the base 2. More precisely, these assembly means comprise a set of spigots 9, with the foot of each of these spigots being secured to the base 2 of the cover plate. The head of each spigot is secured to a thrust ring 8 by seaming.

The thrust ring 8 is in the form of a torus, and has a secondary seating element in facing relationship with a primary seating element 6 which faces towards the pressure plate 3, and which is carried by the base 2 of the cover plate. The seating element 6 is formed in this example by press-forming the base 2 in such a way that the latter here has a cross section which is generally V-shaped.

The spigots 9 are arranged radially inwardly of the seating element 6, which is interrupted at the level of the spigots 9, so that the latter extend between two slots which separate from each other the annular sectors of the bead constituting the seating elements 6. To this end, the base 2 has a flat recessed portion 22 for securing the spigots 9. The diaphragm 4 is thus mounted for pivoting movement between the adjacent elements 6 and 8.

Normally, and as shown in FIG. 1, the clutch is in the engaged position, with the friction liners 51 gripped between the reaction plate 60 and the pressure plate 3. In order to disengage the clutch, it is necessary to exert a thrust on the inner ends of the fingers 42, by means of a clutch release bearing, so as to release the diaphragm 4 from its action on the pressure plate 3.

It will be noted that in this example, the fingers 42 have a curved shape between their inner and outer peripheries, and that the spigots 9 extend in a known manner through the diaphragm via the widened apertures 43.

The pressure plate 3 is dished in facing relationship with the spigots 9, so as to limit its thickness. The cover plate 1, 2 is thus extremely robust, and its base 2, being thicker, undergoes very small variations during the pivoting movement of the diaphragm which occurs during the operation of the clutch by means of the above mentioned clutch release bearing. As a result, for a given declutching travel, the pressure plate 3 imparts a good separation (or lift) on the friction liners 51, in this example under the return action exerted by the tongues 7 towards the base 2 of the cover plate.

The simple shape of the base 2 will be appreciated, this being in the form of a crown which is made in the press very easily with the aid of simple tooling.

In practice, it is possible to use part of the tooling which is used for mass production of cover plates for clutches of the push-off type for the base 2, while a cover plate for a clutch of the pull-off type, of larger size, can be used to constitute the outer part of the cover plate in the clutch according to the invention. In this way, the production for cover plates of the pull-off type can be increased, while material is saved due to the reduced thickness of the cover 11, 12, 13.

The present invention is of course not limited to the embodiment described above and shown in the drawings. In particular, the assembly means whereby the diaphragm 4 is mounted in pivoting relationship to the base 2 of the cover plate may consist of bar-like elements, or spigots, the heads of which have a flange which is adapted to localise the bearing contact between the head and the deflecting zone of the diaphragm, in the manner described in the above mentioned French patent specification FR 1 524 350A. In that case, the thrust ring 8 is omitted.

In a modification, the primary seating element 6 may be formed on a ring which is interposed between the base 2 and the associated thrust surfaces of the spigots 9.

In a further modification, the spigots may carry two thrust rings, between which the diaphragm is mounted for pivoting movement. In a further modification, the assembly means may comprise lugs projecting from the base 2 of the cover plate.

The diaphragm may of course, in the manner described in French patent specification FR 1 524 350A, be mounted for tilting or deflecting movement not within the cover plate as in FIGS. 1 and 2 of the present Application, but on the outside of the cover plate. In that case, the base of the latter is formed with slots for accommodating the bosses of the pressure plate. It will be realised that the invention thus offers major advantages, since the outer part I of the cover plate 1, 2 can be used not only with a diaphragm mounted on the outside of the cover plate, but also with a diaphragm mounted within the cover plate.

The flange 11 may be extended at its outer periphery by an axially oriented raised element in the manner disclosed in the above mentioned French patent specification FR 2 526 901A.

The flange 11 may be part of a hooked element which is secured by sealing to a flange of the reaction plate 60, so as to constitute a clutch module comprising the clutch mechanism with the friction disc 50 and the reaction plate 60.

The base 2 of the cover plate may of course be secured to either the outside or the inside of the junction zone 13, with the weld, which is preferably a continuous seam, being disposed between the edge of the outer periphery of the base 2 and the inner or outer face, as the case may be, of the junction zone 13. In each case, the seating bead 14 limits deformations of the cover 11, 12, 13 during the welding operation.

It will be appreciated that when the base 2 of the cover plate is secured on the outer face of the junction zone 13, the welded joint may be partly accommodated in the hollow of the bead 14.

The thickness of the cover element 2 may be greater than that of the cover element 11, 12, 13, even at the level of its outer edge, especially when it is secured on the inner or outer face of the junction zone 13.

The base of the cover plate can easily be made in a ribbed form, or it can be provided with ventilating fins and/or means for performing any additional functions that may be required.

Finally, the flange 11 can be dispensed with, with the skirt 12 then being secured directly on the reaction plate in the manner described in British patent specification No. 552 952. In a modification, the skirt 12 may be welded on to the reaction plate.

What is claimed is:

1. An annular, dished, metallic cover plate for a diaphragm clutch, said cover plate comprising a base, oriented generally transversely with respect to the rotational axis of the clutch, an annular skirt oriented generally axially with respect to said axis, and a junction zone joining said base and skirt together, wherein the cover plate comprises two parts, namely a first part comprising said skirt and junction zone having an inner periphery, which are integral with each other, and a second part comprising a base of the cover plate having an outer periphery and oriented generally transversely with respect to said axis, said first and second parts defining a welded joint therebetween whereby they are welded to each other and wherein the base is generally comprised of a thicker material than material which comprises the junction zone.

2. A cover plate according to claim 1, wherein the said welded joint comprises a continuous weld seam.

3. A cover plate according to claim 1, wherein the welded joint is defined by the edge of the inner periphery of the said junction zone and the edge of the outer periphery of the said base.

4. A cover plate according to claim 1, wherein the welded joint is formed by means of a laser beam.

5. A cover plate according to claim 4, wherein the welded joint is formed through the thickness of the cover plate.

6. A cover plate according to claim 2, wherein the junction zone and base are of substantially the same thickness at the welded joint.

7. A cover plate according to claim 1, wherein the junction zone and annular skirt of the cover plate constitute a cover element for a clutch of the pull-of type, said cover element including a projecting pressed-out element defining a seat for the diaphragm.

8. A cover plate according to claim 1 in combination with, firstly a clutch diaphragm carried by the cover plate, wherein the diaphragm has an outer peripheral portion defining a Belleville ring, and, secondly, assembly means carried by the base of the cover plate and mounting the inner periphery of the Belleville ring pivotally on the base of the cover plate.

9. A cover plate according to claim 8, wherein the base of the cover plate has a generally V-shaped cross section and defines a seating element for engagement with the Belleville ring, said seating element being made by press forming.

\* \* \* \* \*